(12) United States Patent
Bienes Archel

(10) Patent No.: US 11,293,405 B2
(45) Date of Patent: Apr. 5, 2022

(54) METHOD OF MANUFACTURING A PANEL OF A WIND TURBINE NACELLE

(71) Applicant: Siemens Gamesa Renewable Energy Innovation & Technology S.L., Sarriguren (ES)

(72) Inventor: Carlos Bienes Archel, Huarte (ES)

(73) Assignee: SIEMENS GAMESA RENEWABLE ENERGY INNOVATION & TECHNOLOGY, S.L.

( * ) Notice: Subject to any disclaimer, the term of this patent is extended or adjusted under 35 U.S.C. 154(b) by 170 days.

(21) Appl. No.: 16/655,623

(22) Filed: Oct. 17, 2019

(65) Prior Publication Data
US 2020/0132050 A1 Apr. 30, 2020

(30) Foreign Application Priority Data
Oct. 29, 2018 (ES) ................. ES201800245

(51) Int. Cl.
*F03D 13/10* (2016.01)
*B29C 70/54* (2006.01)
*B29L 31/00* (2006.01)

(52) U.S. Cl.
CPC ............ *F03D 13/10* (2016.05); *B29C 70/541* (2013.01); *B29L 2031/7504* (2013.01);
(Continued)

(58) Field of Classification Search
CPC .......... F05B 2240/14; F05B 2280/6003; F05B 2230/00; F05B 2230/60; B29C 33/42;
(Continued)

(56) References Cited

U.S. PATENT DOCUMENTS

| 5,297,772 A | * | 3/1994 | Stefanick | .............. | B28B 7/0014 249/102 |
| 10,352,306 B2 | * | 7/2019 | Baun | ....................... | F03D 80/82 |

(Continued)

FOREIGN PATENT DOCUMENTS

| CN | 1459367 A | 12/2003 |
| CN | 101440774 A | 5/2009 |

(Continued)

OTHER PUBLICATIONS

European extended search report dated Mar. 20, 2020 for Application No. 19197669.5.

(Continued)

*Primary Examiner* — Lee A Holly
(74) *Attorney, Agent, or Firm* — Schmeiser, Olsen & Watts LLP

(57) ABSTRACT

Provided is a method of manufacturing a panel of a wind turbine nacelle, which method includes the steps of providing a mold for the panel; arranging at least one divider in the mold to spatially divide the mold into at least a first mold region and a second mold region; arranging composite material in the mold; curing the composite material; and separating the cured panel into at least a first panel portion and a second panel portion along a line defined by a divider. Also provided is a method of constructing a wind turbine nacelle, and a wind turbine including such a nacelle.

14 Claims, 5 Drawing Sheets

(52) U.S. Cl.
CPC ....... *F05B 2230/60* (2013.01); *F05B 2240/14* (2013.01); *F05B 2280/6003* (2013.01)

(58) Field of Classification Search
CPC . B29C 2793/0072; B29C 70/30; B29C 70/54; B29C 70/541; F03D 13/40; F03D 80/00; F03D 1/00; F03D 13/10; B29D 99/006; B29L 2031/7504

See application file for complete search history.

(56) References Cited

U.S. PATENT DOCUMENTS

| | | | |
|---|---|---|---|
| 2009/0129931 A1 | 5/2009 | Stiesdal | |
| 2010/0232977 A1 | 9/2010 | Mogensen et al. | |
| 2011/0233819 A1* | 9/2011 | Kulenkampff | B29C 70/545 264/219 |
| 2013/0115073 A1* | 5/2013 | Thiel | F03D 13/20 415/208.1 |
| 2013/0126089 A1 | 5/2013 | Fredskild | |
| 2015/0044413 A1 | 2/2015 | Vauchel et al. | |
| 2015/0273774 A1* | 10/2015 | Stips | B29C 45/14786 428/99 |
| 2015/0308404 A1* | 10/2015 | Dahl | B29C 70/342 416/230 |
| 2016/0167318 A1* | 6/2016 | Cebolla Garrofe | B29C 70/06 156/64 |
| 2017/0363071 A1 | 12/2017 | Baun et al. | |

FOREIGN PATENT DOCUMENTS

| | | | | |
|---|---|---|---|---|
| CN | 102785330 A | | 11/2012 | |
| CN | 103153592 A | | 6/2013 | |
| CN | 104220243 A | | 12/2014 | |
| CN | 105729733 A | * | 7/2016 | |
| GB | 1439191 A | * | 6/1976 | ............ E04C 2/205 |
| KR | 101030521 B1 | | 4/2011 | |
| WO | WO-2019034214 A1 | * | 2/2019 | ........... B29C 70/545 |

OTHER PUBLICATIONS

Non-English Spanish Search Report dated Feb. 18, 2019 for Application No. 201800245.
Spanish Search Report dated Feb. 18, 2019 for Application No. 201800245.
Chinese Office Action dated May 28, 2021 for Application No. 201911036826.2.

* cited by examiner

METHOD OF MANUFACTURING A PANEL OF A WIND TURBINE NACELLE

CROSS-REFERENCE TO RELATED APPLICATIONS

This application claims priority to ES Application No. P201800245, having a filing date of Oct. 29, 2018, the entire contents of which are hereby incorporated by reference.

FIELD OF TECHNOLOGY

The following describes a method of manufacturing a panel of a wind turbine nacelle; a method of constructing a wind turbine nacelle; and a wind turbine.

BACKGROUND

The shipping container most commonly used for transport in Europe and China has the ISO 668 1AA designation, i.e. a length of 40', a width of 8', and a height of 8'6". Such a container is usually simply referred to as a "40-foot standard container". This container size can be used to transport a variety of different payloads. However, any object whose length exceeds 40' (12.19 m) cannot be transported using such a shipping container.

For a large wind turbine with a generator comprising a gearbox, the enclosing nacelle may need to have a length in excess of 40', so that transport of nacelle parts to the installation site may pose significant logistical problems that are costly to resolve. One approach is to manufacture the nacelle using only panels that comply with the 40' constraint, and to assemble the panels on site. For a long nacelle in excess of 40', each panel section is molded using a dedicated mold, which adds significantly to the overall manufacturing costs.

SUMMARY

An aspect relates to an alternative way of constructing a nacelle from parts that can be transported using a standard shipping container.

According to embodiments of the invention, the method of manufacturing a panel of a wind turbine nacelle comprises the steps of providing a mold for the panel; arranging at least one divider in the mold to spatially divide the mold interior into at least a first mold region and a second mold region; arranging composite material of the mold; curing the composite material; and separating the panel into at least a first panel portion and a second panel portion along a line defined by a divider. The panel can later be assembled from the panel portions.

It shall be understood that the shape and dimensions of the mold correspond to the shape and dimensions of a complete panel, i.e. the mold is a negative of the complete panel. Such a panel may be assumed to comprise a number of sides or faces, for example a panel may comprise part of the nacelle floor and also part of a nacelle side wall. It shall be assumed that the panel dimensions exceed the size constraints of a 40-foot shipping container. One or more dividers are arranged in the mold so that the dimensions of each resulting mold region (and corresponding panel portion) lie within payload size constraints of a 40-foot shipping container.

A single divider can be used to define two panel portions for any panel that can be constructed from two portions, each of which fits into a 40-foot shipping container. Of course, any number of dividers can be used to obtain three or more panel portions of a multi-part panel. Since a divider is arranged in the mold to spatially divide the mold interior into adjacent mold regions, it may be assumed to protrude into the mold interior, i.e. to occupy space which would otherwise (in the absence of the divider) be filled by composite material.

Since a divider is used to divide the mold into regions, i.e. to divide a panel into portions, it may be referred to in the following as a mold divider, a panel divider, or a panel separator. The step of arranging composite material in the mold may be understood as the usual layup technique in which layers of composite material such as fiber glass mats, carbon-fiber reinforced plastic, rovings etc., are arranged in the mold. Generally, this is preceded by applying a release agent to all mold surfaces and also to all relevant surfaces of a panel divider. It is also usual to apply a suitable gelcoat layer that will form the outer surface of the cured part. After curing, the panel is demolded, and the divider is removed from between the adjacent panel portions.

An advantage of the inventive method is that it is not necessary to design individual smaller panels that fit into a 40-foot shipping container, and it is not necessary to provide dedicated molds for such panels. Instead, it is possible to use the mold of a large panel (i.e. any panel whose length exceeds the length of a 40-foot shipping container) as a basis, from which smaller panel portions are formed by judicious placement of one or more dividers in the mold. Costs can be kept to a favorable minimum by using an already existing mold for such a large panel, for example a mold used to manufacture a 13 m side, floor or roof panel of a nacelle.

According to embodiments of the invention, the method of constructing a wind turbine nacelle comprises the steps of providing a set of nacelle panels at an installation site, whereby at least one panel is a multi-part panel manufactured using the inventive panel manufacturing method as described above; connecting panel portions of a multi-part panel; and assembling all panels of the set to obtain the complete nacelle. Since the panel portions of any panel of the nacelle can be manufactured with relatively little effort to fit inside a 40-foot shipping container, the nacelle manufacturing and transport costs can be kept to an advantageously low level.

According to embodiments of the invention, the wind turbine comprises a nacelle constructed in the manner described above. The costs associated with construction of the nacelle can be reduced as described above, so that the cost of installing the wind turbine is also correspondingly low.

Particularly advantageous embodiments and features of the invention are given by the dependent claims, as revealed in the following description. Features of different claim categories may be combined as appropriate to give further embodiments not described herein.

A 40-foot shipping container is sometimes also referred to as a "maritime container" or "standard container", so that these terms may be used interchangeably.

In the following, without restricting embodiments of the invention in any way, it may be assumed that the nacelle is for a wind turbine comprising a drivetrain with a gearbox, power converter modules etc., since this type of wind turbine requires a relatively long nacelle to accommodate the various components.

After curing the panel, it is separated into two or more panel portions. As explained above, a divider occupies space which would otherwise be filled by composite material. In a very simple approach, a divider can comprise a band of suitable material such as metal, plastic etc. that is at least as thick as the composite material, i.e. at least as thick as the panel wall thickness. In such an approach, composite material can be laid up in the mold on either side of the divider. After curing, the panel portions can simply be lifted out of the mold. However, such an approach may involve more effort in the lay-up process, since the edges of each portion must terminate cleanly along the divider. Therefore, in preferred embodiments of the invention, the composite material is arranged in the mold to completely cover the divider. After curing, adjacent panel portions are separated by cutting along a line defined by the corresponding divider.

Adjacent panel portions must be joined together when the nacelle is being assembled. A joint between adjacent panel portions must be structurally strong as well as water-tight. Therefore, the divider is not simply used to delineate adjacent panel portions, and is instead shaped to also define a connection interface between the panel portions. In preferred embodiments of the invention, a divider comprises a T-shaped profile, for example a T-bar having dimensions of a standard EN-10055 profile, or two back-to-back standard EN-10056 angle profiles. While these standards apply to steel parts, the divider used in the inventive method can be made of any suitable material and is shaped according to such a standard. With one or more such T-shaped dividers arranged in the mold, the resulting cast panel will exhibit one or more corresponding raised ridges. The individual panel portions can be separated easily by cutting through the raised ridge formed by a divider. The height of the cutting line can be chosen to leave a flange along the edge of each panel portion, and the corresponding flanges can be connected together in a suitable manner when the nacelle is being assembled.

A nacelle panel does not always comprise a simple flat or planar shape. Instead, a nacelle panel (and its corresponding mold) may include a step or other contour. Therefore, in preferred embodiments of the invention, a panel divider is shaped to follow such a step or a contour in the mold.

During layup, it is necessary to ensure that the divider does not move from its original position, so that the panel portions will have the intended dimensions. Therefore, in preferred embodiments of the invention, the step of providing the mold comprises a step of forming inserts to receive fasteners for securing a panel divider to a surface of the mold. A row of holes can be formed in the mold, for example along a line corresponding to the center line of a divider, so that the divider can be screwed to the mold (using screws inserted from the outside of the mold).

Once the panel portions of a nacelle have been manufactured as described above, these can be loaded into a standard container and transported to an installation site.

The panels of a nacelle are generally manufactured to a high degree of accuracy, so that when the panels are assembled, the nacelle specifications are met. Using the inventive method, panel portions of a panel are manufactured using a mold whose dimensions correspond to the complete panel. However, because one or more dividers are used to define the panel portions, the combined length of the panel portions will be less than the specified length of a panel. The difference will correspond essentially to the total width of the dividers used in manufacturing the panel portions. Therefore, in preferred embodiments of the invention, the step of connecting adjacent panel portions comprises arranging a spacer between the panel portions, wherein the thickness of the spacer corresponds to the thickness of the divider that was used to delineate those panel portions. Such a spacer can be an injection-molded or 3D-printed part, for example a 3D-printed part made from a suitable thermoplastic such as acrylonitrile styrene acrylate (ASA). Such a spacer comprises a spacer body and a sealant layer such as a strip of sealing tape applied to the spacer body and arranged to lie against a corresponding surface of a panel portion. The thickness of a spacer does not exceed the thickness of the corresponding divider. The spacer body exhibits a high degree of stiffness.

As mentioned above, two adjacent panel portions can have a low flange along their edges, and these can be joined together when the nacelle is being assembled. Such a joint or "seam" can be relatively long. Therefore, instead of providing a single spacer with the same length as the joint or seam, a spacer comprises a plurality of shorter spacer elements. In preferred embodiments of the invention, the spacer elements are formed so that each spacer element is shaped to engage with an adjacent spacer element. A connection between adjacent spacer elements can be achieved by a suitable form-fit shape of the corresponding edges of adjacent spacer elements. Such an approach allows a favorably quick assembly of adjacent panel portions.

To ensure a robust connection between panel portions, these are bolted or screwed together. To this end, a spacer comprises a number of bushings, wherein a bushing is arranged to accommodate a fastener used to connect two panel portions. The spacer can be formed so that the outer end of a bushing extends beyond the level of the spacer body by an amount corresponding to the thickness of a sealant layer.

A spacer and/or spacer elements can be made of any suitable material and can be made using any suitable technique. For example, spacer elements can be made as injection-molded parts. Equally, spacer elements can be 3D-printed parts made from a suitable thermoplastic such as acrylonitrile styrene acrylate (ASA).

BRIEF DESCRIPTION

Some of the embodiments will be described in detail, with reference to the following figures, wherein like designations denote like members, wherein.

DETAILED DESCRIPTION

Figure 1:
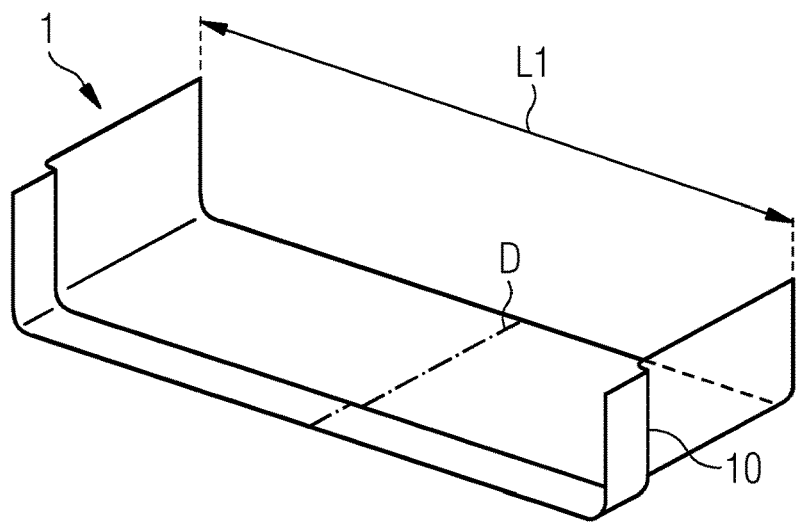
FIG. 1 shows a one-piece panel of a nacelle.
Figure 9:
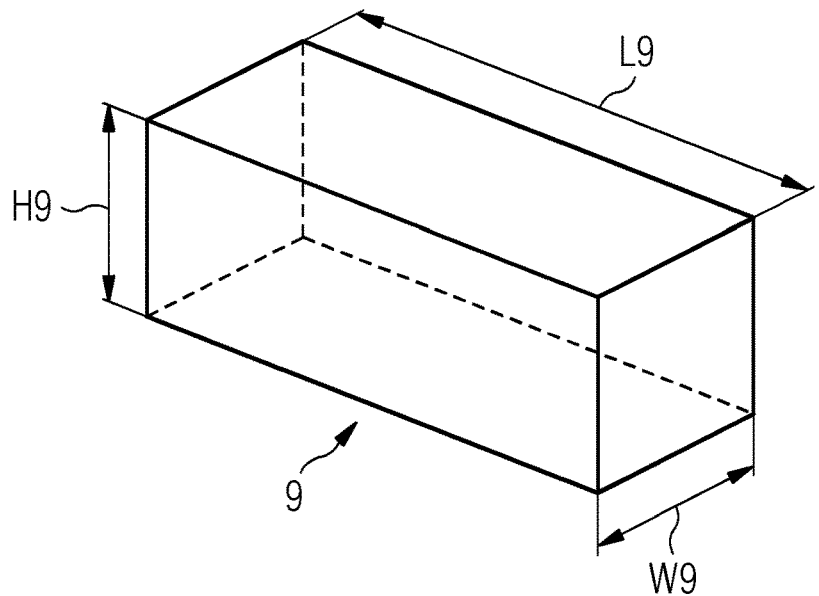
FIG. 9 shows a standard shipping container.

FIG. 1 shows a one-piece panel 1 of a nacelle. The dimensions of the nacelle are such that the length L1 of the one-piece panel 1 exceeds the length of a standard shipping container used to transport wind turbine components to an installation site. Such an exemplary shipping container 9 is shown in FIG. 9. The standard container or 40' container has a length L9 of 40', a width W9 of 8' and a height H9 of 8'6". To be able to transport nacelle panels with such a container, long panels must be assembled from smaller parts. The known approach is to construct smaller molds for the smaller parts. The added cost of these steps can be considerable, especially when the panel 1 includes irregular shapes such as the contour 10 shown here.

Figure 2:
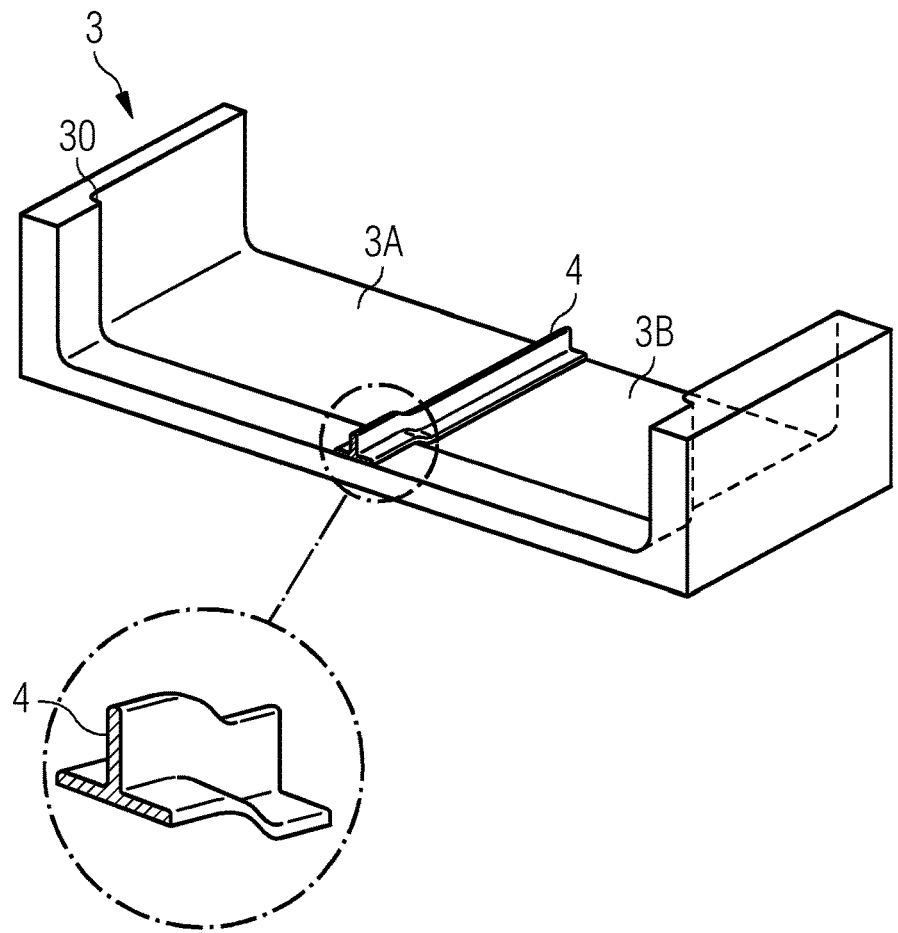
FIG. 2 shows stages in an embodiment of the inventive manufacturing method.

In the manufacturing method according to embodiments of the invention, a different approach is taken. Here, a mold 3 which been constructed for the manufacture of a one-piece panel 1 as shown in FIG. 1 is used. A suitable division line D is chosen, as indicated in FIG. 1, and through-holes are formed in the mold 3 along that line. By means of fasteners inserted through these holes, a divider 4 is secured to the mold 3 to delineate or define a first mold region 3A and a second mold region 3B as shown in FIG. 2. In this exemplary embodiment, the divider 4 is formed as a profile with a T-shaped cross-section. The divider 4 can be a 3D-printed or injection-molded part, formed to follow any contour of the mold 3, as shown in the enlarged portion of the diagram. The position of the divider 4, which will result in a ridge or seam in the nacelle interior, is planned under consideration of the intended positions of components within the nacelle. The diagram only shows a single divider, but it shall be understood that any number of dividers can be arranged in the mold to obtain a corresponding number of panel portions. The surfaces of the mold 3 and the divider 4 are coated in the usual manner with a release coat. Gelcoat layers can also be applied as appropriate.

Figure 3:
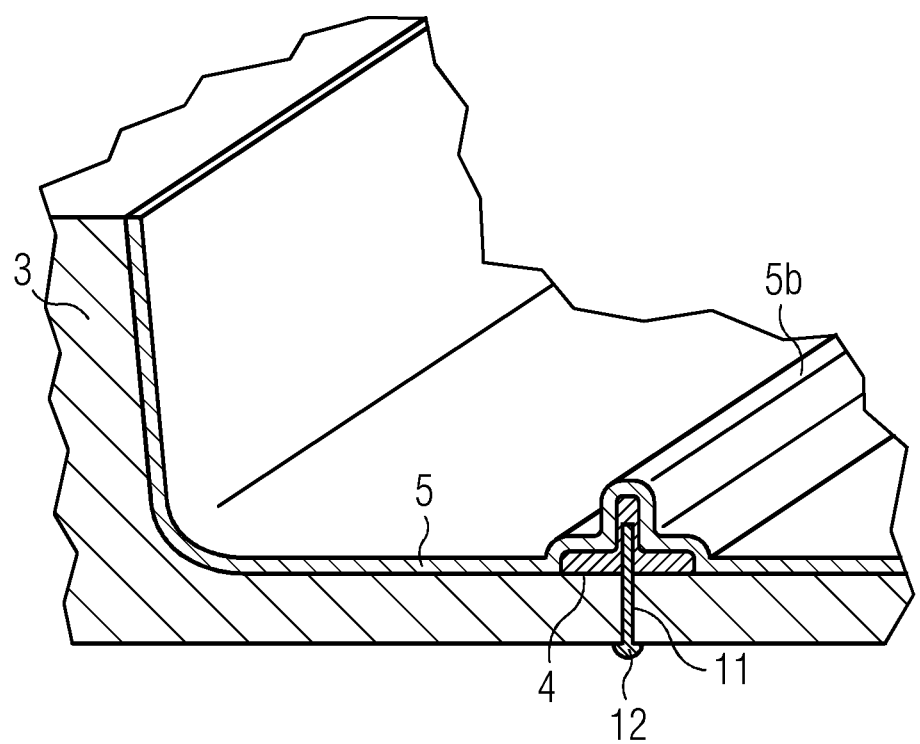
FIG. 3 shows a further stage of the manufacturing method.

FIG. 3 shows a further stage in the manufacturing method. After arranging layers of composite material 5 such as fiber glass mats, rovings etc. in the mold, thereby also completely covering the divider 4, the composite material is cured. A ridge 50 has been formed, following the shape of the divider 4. This diagram also shows a through-hole 11 formed in the mold 3 along the division line, and a fastener 12 used to secure the divider 4 to the mold 3.

Figure 4:
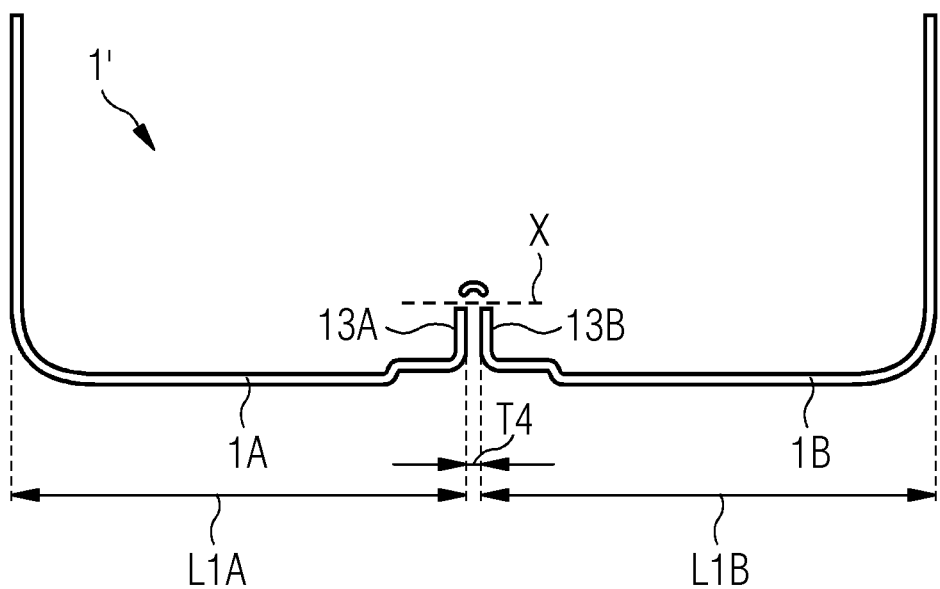
FIG. 4 shows a subsequent stage of the manufacturing method.

FIG. 4 illustrates a subsequent stage in the manufacturing method. Here, the cured panel 1' is shown, with an exemplary cutting line X along the top of the ridge 50. Using a suitable blade or saw, the tip of the ridge 50 shown in FIG. 3 is removed, effectively separating a first panel portion 1A from a second panel portion 1B. The combined lengths (L1A+L1B) of the panel portions 1A, 1B will be less than the length L1 of the desired panel, owing to the thickness 40 of the divider 4.

Figure 5:
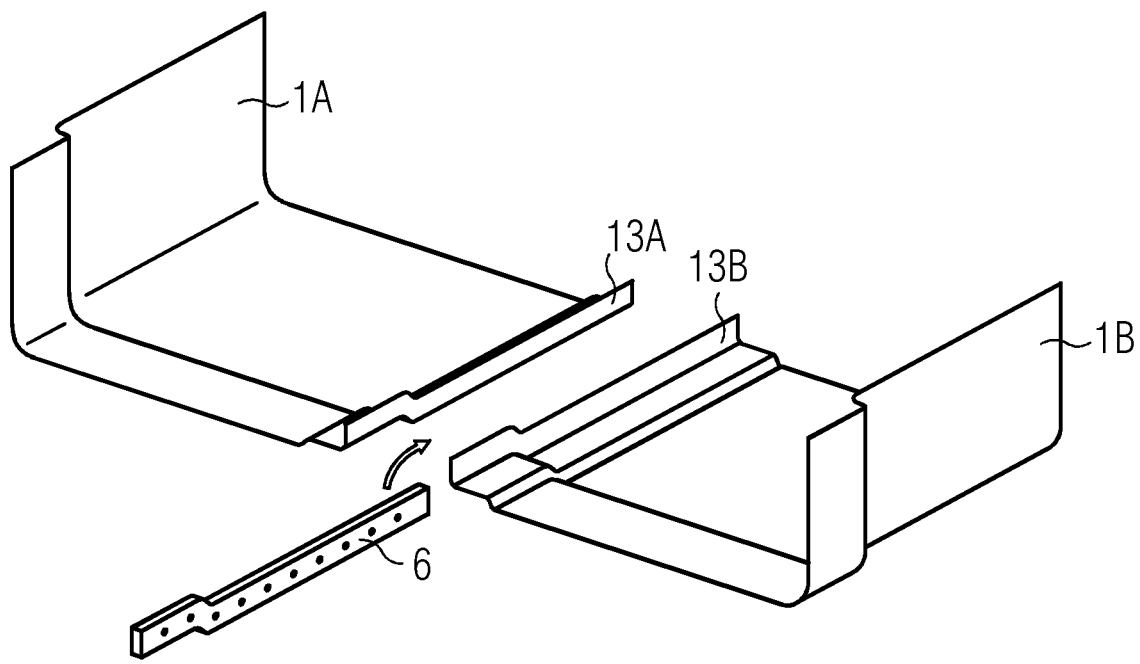
FIG. 5 shows a stage in the assembly of panel portions obtained using the inventive manufacturing method.

FIG. 5 shows a stage in the assembly of the panel portions 1A, 1B of FIG. 4. Here, a spacer 6 is shown. The spacer 6 will lie between opposing faces 13A, 13B of the panel portions 1A, 1B. This spacer 6 will compensate for the thickness T4 of the divider 4 and will be used to join the panel portions 1A, 1B.

Figure 6:
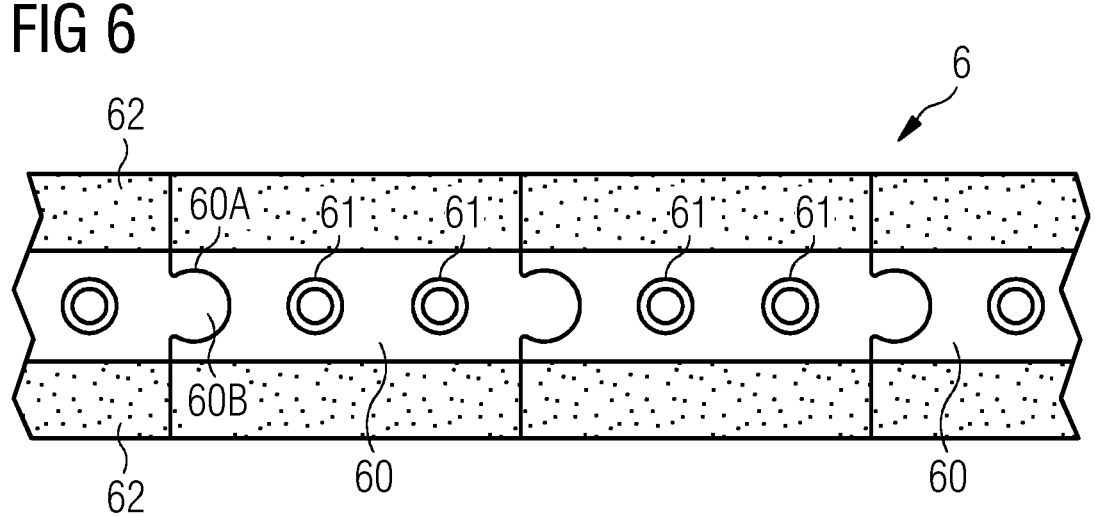
FIG. 6 shows an exemplary spacer used to connect panel portions obtained using the inventive manufacturing method.

FIG. 6 shows an exemplary spacer 6. Here, the spacer 6 comprises a series of interconnecting spacer elements 60. Each spacer element 60 or spacer body 60 has complementary form-fit shapes 60A, 60B at its outer ends so that each spacer element 60 can engage with two further identical spacer elements 60. The diagram also shows two bushings 61 extending through a spacer body 60. Each bushing 61 can accommodate a fastener when the panel portions are being joined. The diagram also shows strips of sealant tape 62.

Figure 7:
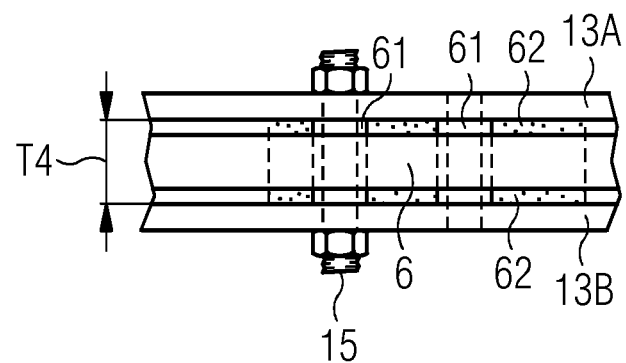
FIG. 7 shows a connection between panel portions obtained using the inventive manufacturing method.

FIG. 7 illustrates a connection between panel portions 1A, 1B, showing a spacer body 6 between opposing faces 13A, 13B of the panel portions 1A, 1B. The diagram shows that a bushing 61 extends outward on each side of the spacer body 60 so that the end-to-end length of a bushing 61 corresponds to the thickness T4 of the divider 4. The sealant tape 61 can be slightly thicker than the protruding end of a bushing 61, so that the sealant tape can be compressed to a certain extent when fasteners 15 are used to join the panel portions 1A, 1B on either side of the spacer 6.

Figure 8:
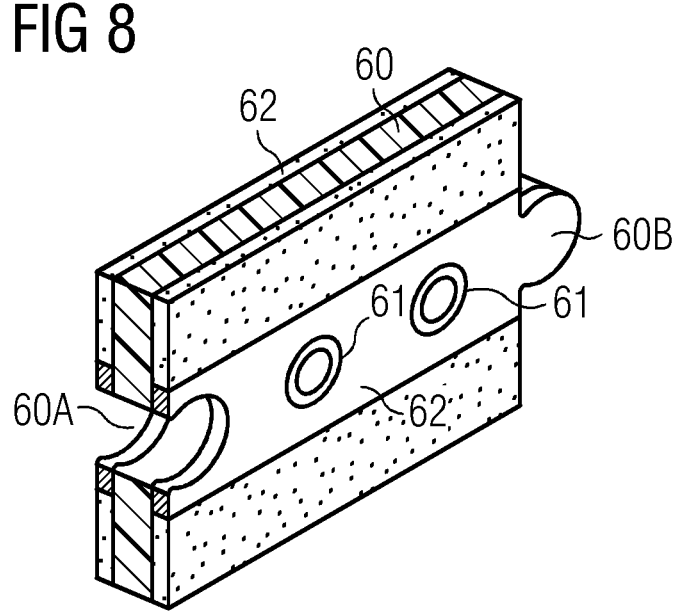
FIG. 8 shows an alternative spacer used to connect panel portions obtained using the inventive manufacturing method.

FIG. 8 shows an alternative realization, in which sealant material 61 is applied over the side surfaces of a spacer body 60.

Figure 10:
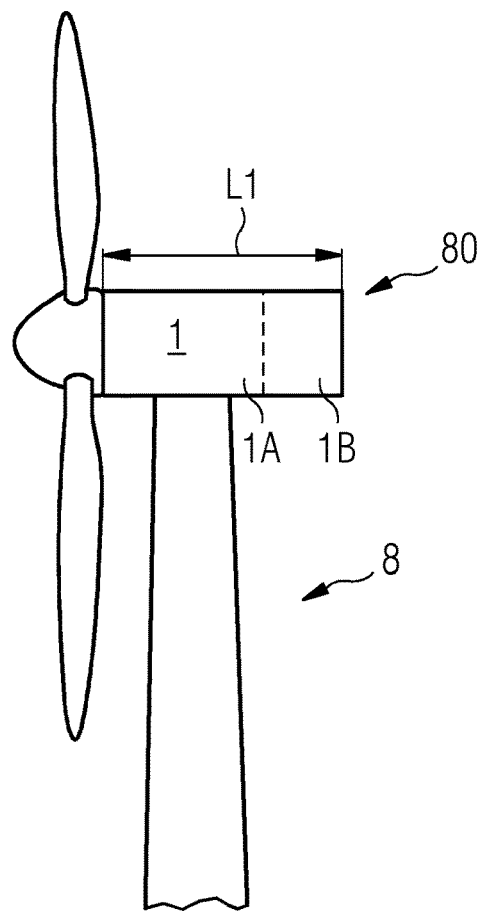
FIG. 10 shows an embodiment of the inventive wind turbine.

FIG. 10 shows a wind turbine 8 comprising a nacelle 80 assembled from at least two side panels, a roof panel, a floor panel, and a rear panel. The overall length of the nacelle 80 corresponds to the length L1 of the longest panel, for example a side panel 1. When this length L1 exceeds the length L9 of a standard shipping container 9 as shown in FIG. 9, the panel 1 is made as a multi-part panel, for example a two-part panel as shown here, with panel portions 1A, 1B manufactured and assembled as explained above. Because the panel portions are made from the same mold that would be used to manufacture a one-piece panel shown in FIG. 1, the dimensions of the multi-part panel are essentially the same as the dimensions of the one-piece panel. This simplifies installation of the wind turbine.

Although the present invention has been disclosed in the form of preferred embodiments and variations thereon, it will be understood that numerous additional modifications and variations could be made thereto without departing from the scope of the invention. For example, a divider can be bolted onto the mold by fasteners extending through the body of the divider and into the body of the mold. Alternatively, a divider can be secured to the mold using any suitable adhesive. Instead of the spacer described above, two panel portions can be joined or connected using any suitable parts, whereby the dimensions of the parts and the materials from which they are made may be chosen under consideration of factors such as material hardness, compressibility, durability etc.

For the sake of clarity, it is to be understood that the use of "a" or "an" throughout this application does not exclude a plurality, and "comprising" does not exclude other steps or elements.

The invention claimed is:

1. A method of manufacturing a panel of a wind turbine nacelle comprising:
    providing a mold for the panel;
    arranging at least one divider in the mold to spatially divide the mold into at least a first mold region and a second mold region;
    arranging composite material in the mold;
    curing the composite material to provide a cured panel; and
    separating the cured panel into at least a first panel portion and a second panel portion along a line defined by the at least one divider.

2. A method of constructing a wind turbine nacelle, comprising:
    providing a set of nacelle panels at an installation site, whereby at least one panel is provided in the form of panel portions of a multi-part panel manufactured using the method according to claim 1;
    connecting panel portions of a multi-part panel; and
    assembling all panels of the nacelle panel set.

3. The method according to claim 2, wherein connecting portions of a multi-part panel comprises arranging a spacer between opposing faces of the panel portions.

4. The method according to claim 3, wherein the spacer comprises a sealant layer arranged to lie against a corresponding surface of a panel portion.

5. The method according to claim 3, wherein the thickness of the spacer does not exceed the thickness of the corresponding divider.

6. The method according to claim 3, wherein the spacer comprises a plurality of spacer elements, wherein a spacer element is shaped to engage with an adjacent spacer element.

7. The method according to claim 3, wherein a spacer comprises a number of bushings, and wherein a bushing is arranged to accommodate a fastener extending through opposing faces of the first and second panel portions.

8. The method according to claim 2, wherein providing the nacelle panel set comprises transporting the panel portions of a multi-part panel to the installation site by a 40-foot shipping container.

9. The method according to claim 1, wherein the at least one divider is arranged in the mold so that the dimensions of the mold regions lie within size constraints of a 40-foot shipping container.

10. The method according to claim 1, wherein the at least one divider is shaped to form a connection interface between a first panel portion and a second panel portion.

11. The method according to claim 1, wherein the at least one divider comprises a T-shaped profile.

12. The method according to claim 1, wherein arranging composite material in the mold includes covering the at least one divider.

13. The method according to claim 1, wherein the at least one divider is shaped to follow a contour in the mold.

14. The method according to claim 1, wherein providing the mold comprises forming inserts to receive fasteners for securing a divider to a surface of the mold.

* * * * *